United States Patent [19]

Luke

[11] Patent Number: 4,517,834
[45] Date of Patent: May 21, 1985

[54] TIRE PRESSURE SENSING SYSTEMS

[75] Inventor: Douglas V. Luke, Farnham Common, England

[73] Assignee: Smiths Industries Public Limited Company, London, England

[21] Appl. No.: 589,444

[22] Filed: Mar. 14, 1984

[30] Foreign Application Priority Data

Mar. 23, 1983 [GB] United Kingdom ............... 8307986

[51] Int. Cl.³ .................... B60C 23/02; G01L 7/06
[52] U.S. Cl. ................................... 73/146.5; 73/705; 250/231 P
[58] Field of Search .............. 73/146.5, 146.8, 146.4, 73/705; 250/231 P; 340/58

[56] References Cited

U.S. PATENT DOCUMENTS

| 4,004,270 | 1/1977 | Claxton et al. | 340/58 |
|---|---|---|---|
| 4,004,272 | 1/1977 | Claxton et al. | 340/58 |
| 4,071,753 | 1/1978 | Fulenwider et al. | 250/231 R |
| 4,086,564 | 3/1978 | Claxton et al. | 340/58 |
| 4,180,794 | 12/1979 | Claxton et al. | 73/146.5 |

Primary Examiner—Donald O. Woodiel
Attorney, Agent, or Firm—Pollock, Vande Sande and Priddy

[57] ABSTRACT

A tire pressure sensing system has a sensor mounted on the tire hub, the sensor having a mask that is moved on change in tire pressure. Two rows of fibres at the end of a fibre-optic cable are positioned on opposite sides of a slit in the mask. The fibres of the two rows extend along a central core and an outer ring respectively of the cable. The rear end of the cable is mounted coaxially of the tire in alignment with a stationary cable having an inner core and an outer ring which extend to a radiation source and to a detector respectively. The source supplies radiation, via the cable, to the outer ring of the cable and hence to the row of fibres. Change in pressure moves the mask, thereby changing the amount of radiation received by the other row of fibres which passes to the outer ring of the stationary cable and thereby to the detector. The detector monitors the radiation and provides an output indicative of tire pressure.

10 Claims, 7 Drawing Figures

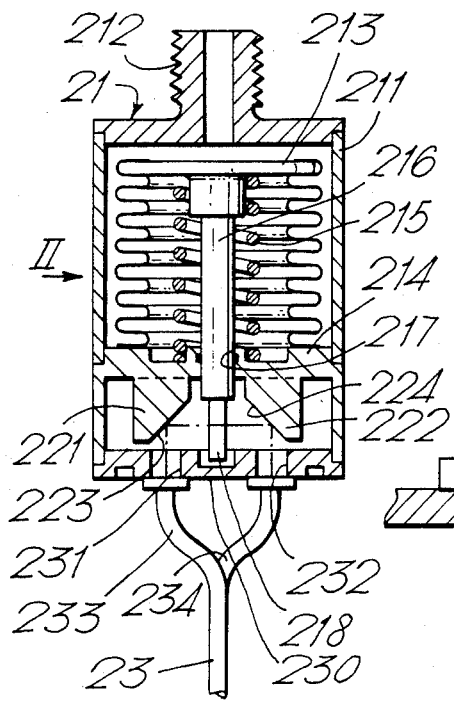
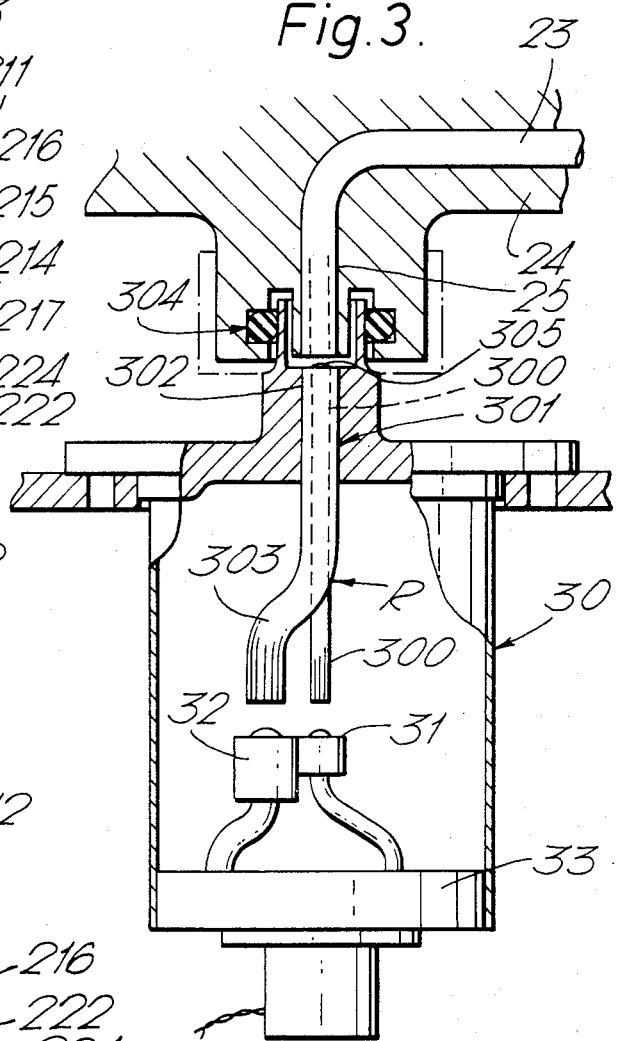
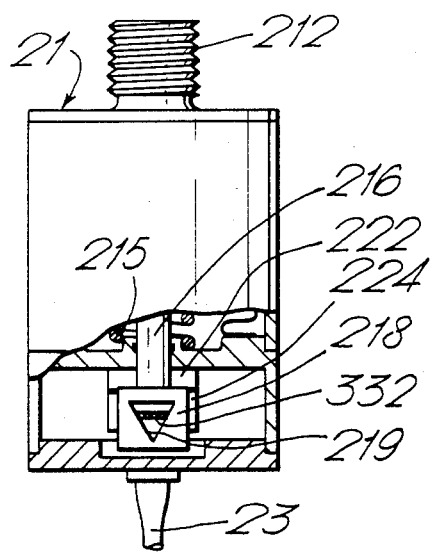

TIRE PRESSURE SENSING SYSTEMS

BACKGROUND OF THE INVENTION

This invention relates to tire pressure sensing systems.

The invention is particularly, but not exclusively concerned with systems for sensing the pressure of tires on aircraft wheels.

Aircraft wheel tires are subjected to high rotational speeds and heavy loading, especially during take-off and landing. Failure of a tire may not be readily apparent to the pilot or flight engineer, especially where several wheels are mounted on a common axle. The excessive loading that the failure of one tire puts on the remaining tires can cause other tires to fail, with severe consequences. Undue high pressure within a tire, such as caused by over inflation or excessive heating can lead to failure. If this high pressure can be monitored it may be possible to take remedial action to avoid failure of the tire or to reduce the effects of such a failure.

Measuring the pressure of a tire on a rotating wheel causes problems because of the need to make electrical connection between the rotating wheel and the static airframe. Various systems have been proposed to overcome this, such as, for example by using electrical inductive techniques. These previous systems suffer from several disadvantages. The large weight of previous systems is a disadvantage especially for large aircraft having many wheels each of which has a tire pressure monitor. The adverse environment has caused problems in providing systems capable of withstanding the vibration, shock, and centrifugal forces whilst still providing a measure of tire pressure of sufficient accuracy. Some previous systems rely on rotation of the wheel and are not capable of providing a reading while the wheel is stationary—this is a disadvantage since tire pressure cannot be checked prior to landing or while the aircraft is stationary prior to taxiing.

Some of these difficulties are also met when providing a tire pressure monitor for land vehicles.

BRIEF SUMMARY OF THE INVENTION

It is an object of the present invention to provide a tire pressure sensing system that can be used substantially to alleviate the above-mentioned disadvantages.

According to one aspect of the present invention there is provided a tire pressure sensing system including a pressure sensor mounted for rotation with the tire, the sensor being arranged to supply optical output signals representative of pressure within the tire to an optical radiation guide mounted for rotation with the tire, the guide being arranged to direct the optical output signals to a location substantially coaxial of the tire, the system including an optical receiver mounted on a stationary member coaxial of the tire and aligned to receive the optical output signals from the guide at that location, and the receiver being arranged to supply signals indicative of tire pressure to a remote location.

The receiver may be arranged to supply radiation to the sensor, the sensor being arranged to modify the radiation in accordance with change in pressure. The radiation guide may be fibre-optic cable means, which may include an inner bundle of fibres and an outer bundle of fibres surrounding the inner bundle, radiation being supplied to the sensor along one bundle and being supplied from the sensor to the receiver along the other bundle. Radiation may be supplied to the sensor along the inner bundle and be supplied from the sensor to the receiver along the outer bundle. The receiver may include fibre-optic cable means one end of which is aligned with the radiation guide mounted for rotation with the tire, the fibre-optic cable means being arranged to supply the optical output signals from the radiation guide to radiation detector means. The fibre-optic cable means in the receiver may include an inner bundle of fibres and an outer bundle of fibres surrounding the inner bundle, said inner bundle of fibres extending to radiation emitter means and said outer bundle extending to radiation detector means. The sensor may be arranged to vary the amplitude of the optical output signals in accordance with change in pressure. The sensor may include an array of radiation-emitting elements located on one side of a mask that is arranged for displacement in accordance with change in pressure, the radiation guide being located on the opposite side of the mask; and displacement of the mask controlling radiation supplied to the radiation guide from the array of radiation-emitting elements. The array of radiation-emitting elements may be provided by the ends of a row of fibres. The mask may have a triangular slot therein through which different numbers of the radiation-emitting elements are visible at different pressures. The cable means may include a plurality of fibres associated respectively with individual ones of the array of radiation-emitting elements, and the receiver being arranged to monitor the output of each of the fibres so as to determine which of the radiation-emitting elements is exposed by the mask and hence provide an indication of pressure. The sensor may include a bellows unit, one side of the bellows unit being in communication with tire pressure, and the other side of the bellows unit being coupled with the mask so that deflection of the bellows on change in pressure causes displacement of the mask. The receiver may also be arranged to provide an indication of the rotational speed of the tire. The system may include a plurality of tires and a plurality of receivers associated with respective tires, each tire having a different coding associated therewith, and each receiver including pick-off means arranged to sense the coding and provide an output signal characteristic of the tire. The tire pressure sensing system may include a rotatable seal between the receiver and the radiation guide, the seal being resistant to moisture and contaminants.

An aircraft tire pressure sensing system will now be described, by way of example, with reference to the accompanying drawings.

BRIEF DESCRIPTION OF THE DRAWINGS

FIG. 2A is a sectional side elevation to a larger scale of a pressure sensor forming a part of the system of FIG. 1;

FIG. 2B is a partly cut-away view of the sensor of FIG. 2A, along the arrow II;

FIG. 3 is a schematic sectional side elevation to a larger scale of a transmitter/receiver unit forming a part of the system of FIG. 1;

DETAILED DESCRIPTION

Figure 1:
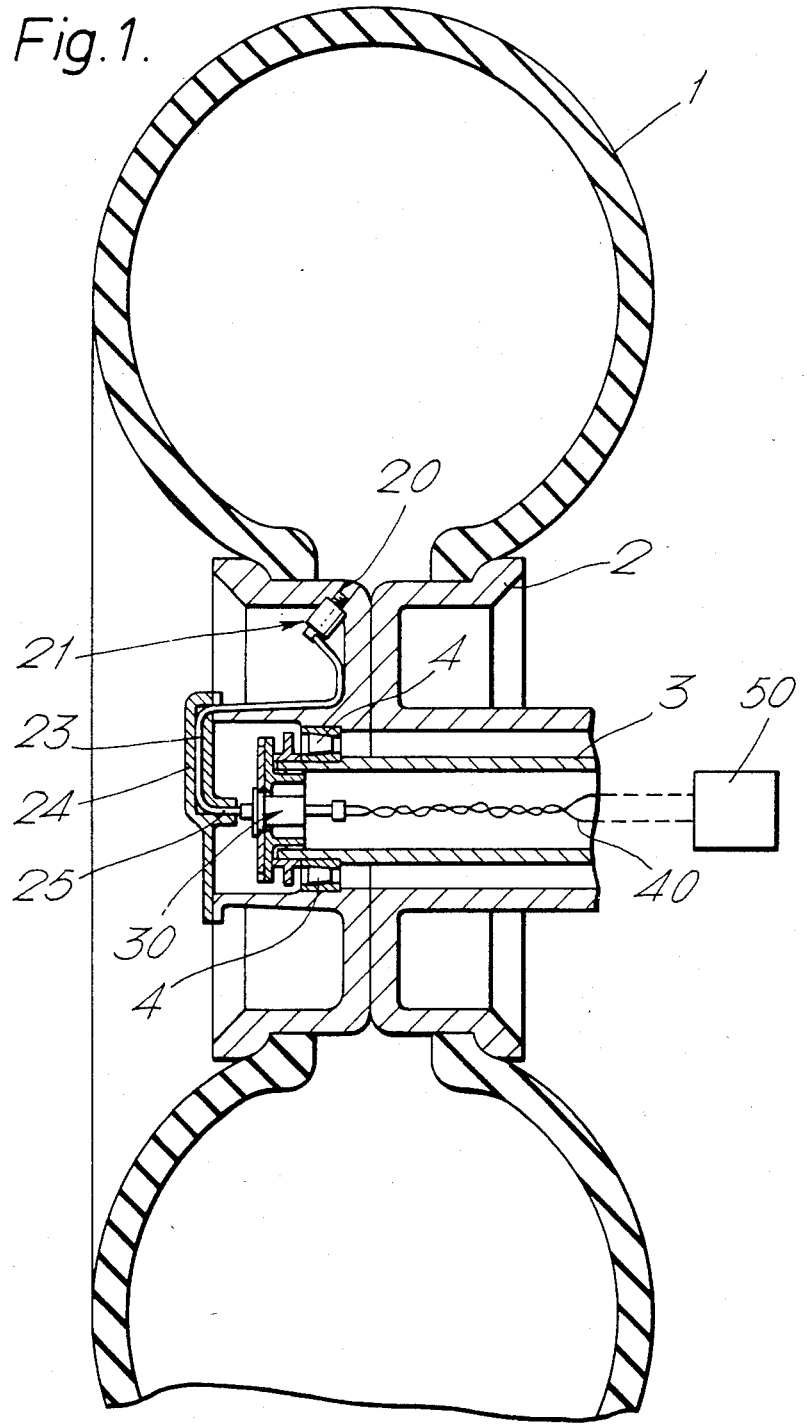
FIG. 1 is a sectional side elevation of an aircraft wheel showing the pressure sensing system.

With reference to FIG. 1, the aircraft tire 1 is carried on an axial hub 2 that is mounted at one end of a stationary shaft 3 by means of bearings 4. The hub 2 has an aperture 20 which communicates with the interior of the tire 1 and which conventionally is sealed by a fusible plug that acts to prevent excessive pressure within the tire due to overheating. In the present invention, the aperture 20 is sealed by an optical pressure sensor 21 the construction of which is described in greater detail later. Optical radiation is supplied to and from the sensor 21 by means of a single, multifilament optical-fibre cable 23 that extends underneath a protective cover plate 24 to a central location at the end of the shaft 3. This rear end 25 of the cable 23 remote from the sensor 21 is aligned axially of the shaft 3.

Mounted on the shaft 3 there is a stationary transmitter/receiver unit 30 that supplies optical radiation to the cable 23 and receives optical signals from the sensor 21, and that is shown in greater detail in FIG. 3. The transmitter/receiver unit 30 includes an infra-red, light-emitting diode or semiconductor laser 31 and a detector 32. Electrical signals to and from the emitter and detector are supplied via an electronics unit 33 within the unit 30 along external electrical cables 40 that extend along the shaft 3 to a suitable indicator or warning unit 50 in the aircraft cockpit.

The pressure sensor 21 will not be described in greater detail with reference to FIGS. 2A and 2B. The sensor 21 comprises an hermetically sealed cylindrical outer case 211 that is provided at one end with an externally threaded inlet port 212 that is received within the aperture 20 in the hub 2. Pressure from within the tire 1 is supplied via the inlet port 212 to the interior of the case 211. Within the case 211 there is mounted a closed cylindrical bellows unit or capsule stack 213 that is sealed about its lower end to a base plate 214. A helical spring 215 within the bellows unit 213 urges it to an expanded state against the action of the pressure supplied to the exterior of the bellows unit 213 from the tire 1. The spring 215 encircles an axial, vertical rod 216 the upper end of which is joined to the upper end of the bellows unit 213, and the lower end of which projects through an axial aperture 217 in the base plate 214. At its lower end, the rod 216 carries mask 218 having a triangular slot 219 the base of which is horizontal and at the upper end of the mask, and the apex of which is vertically below the base, on the axis of the rod (FIG. 2B).

Beneath the base plate 214 project two studs 221 and 222 that are located on opposite sides of the aperture 217, the mask 218 extending transversely of a line joining the two studs. The lower face 223, 224 of each stud is an optically flat surface inclined at 45° to the horizontal, the planes of the two faces lying at right angles to each other, and each face being coated by vacuum deposition with a reflective layer. A cover plate 230 encloses the studs 221 and 222 below the base plate 214. The cover plate 230 has two rectangular apertures 231 and 232 located directly beneath the centre of each stud 221 and 222 respectively, the length of each aperture extending parallel to the mask 218. Each aperture 231 and 232 receives the end of a respective fibre-optic bundle 233 and 234, the ends of the fibres of each bundle being arranged in a row along the length of the aperture. The sensor 21 is constructed such that if the bellows unit 213 ruptures, pressure from the tire will be contained within the housing 211.

Figure 4:
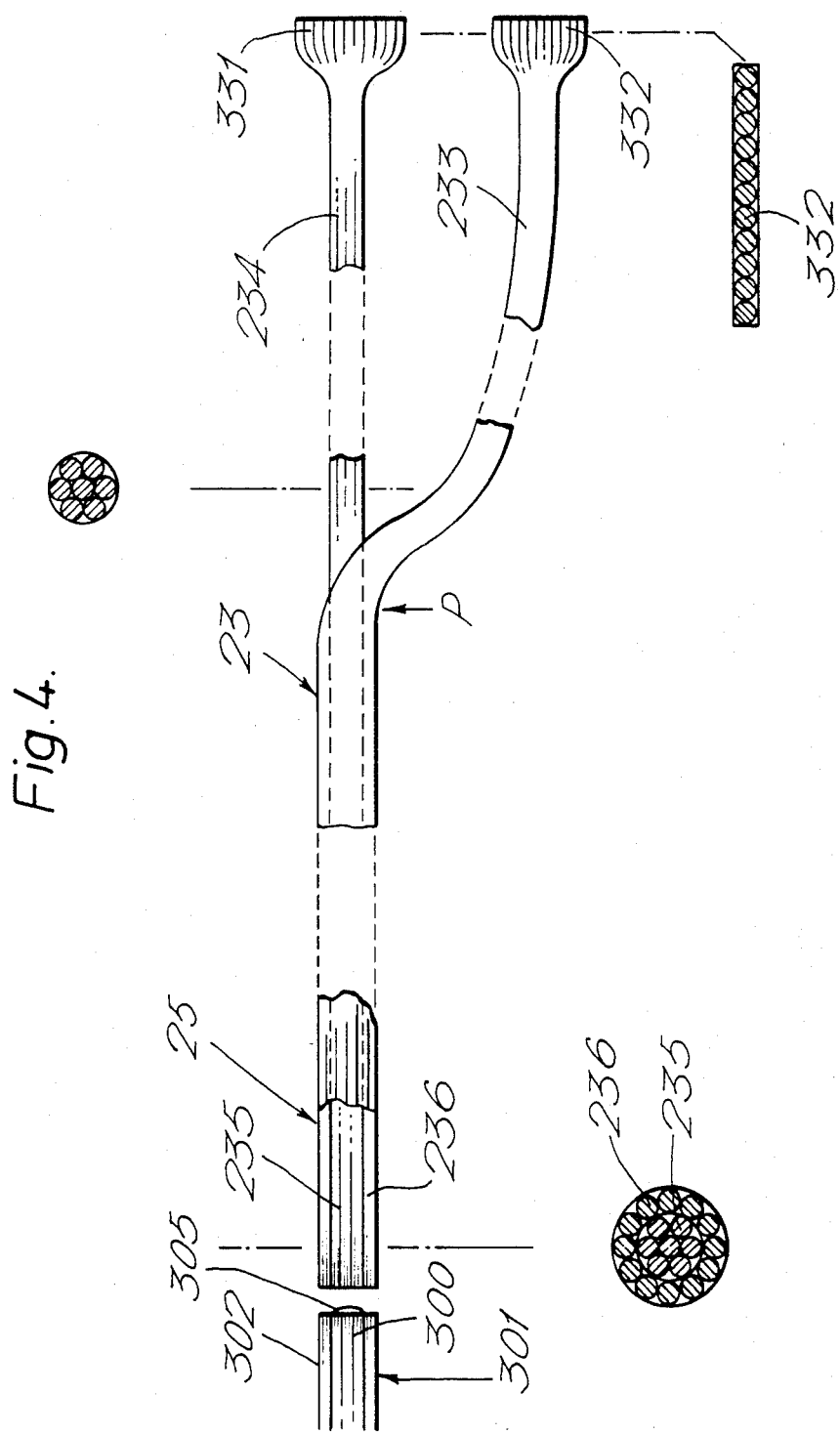
FIG. 4 illustrates schematically a cable used to interconnect the sensor of FIGS. 2A and 2B and the receiver unit of FIG. 3.

With particular reference to FIG. 4, the fibre-optic bundles 233 and 234 form a part of the fibre-optic cable 23. At the rear end 25 of the cable 23, close to the transmitter/receiver unit 30, the cable is of coaxial construction and circular section, having an inner core 235 of optical fibres, that is surrounded by an outer ring 236 of optical fibres. At a point P along its length the inner core 235 and the outer ring 236 are split into the separate bundles 234 and 233 respectively. The bundles 233 and 234 may be of circular section (as shown in FIG. 4) along most of their length, being flattened into respective rows of fibres 331 and 332, close to the apertures 231 and 232, or they may be of flat, ribbon-like construction along their entire length from the division point P. The bundle 234, which is an extension of the inner core 235, supplies infra-red radiation to the sensor 21, whereas the bundle 233 carries the radiation from the sensor that is reflected by the faces 223 and 224 and transmitted through the slot 219.

Radiation is supplied to the receiver end of the inner core 235 of the cable 23 from the inner core 300 of a similar coaxial fibre-optic cable 301 in the transmitter/receiver unit 30. The inner core 300 extends to the emitter 31 and is optically coupled to it such as by means of a lens. The outer ring 302 of the cable 301 is separated from the inner core 300 as a separate bundle 303 at a point R along the length of the cable. The rear end of the bundle 303 extends to the detector 32. The forward end of the transmitter/receiver cable 301 and the rear end of the sensor cable 23 are accurately aligned and closedly spaced from one another within a moisture and contaminant resistance rotating seal 304. A micro-lens 305 is mounted on the inner core 300 of the transmitter/receiver cable 301 and focusses radiation onto the inner core 235 of the sensor cable 23.

In operation, infra-red radiation from the emitter 31 in the transmitter/receiver unit 30 is supplied via the inner core 300 of the cable 301 to the sensor cable 23 which in turn supplies radiation to the row 331 of fibres in the aperture 232 of the sensor 21. Radiation emitted by the row 331 of fibre ends is reflected by the inclined face 224 through the triangular slot 219 in the mask 218. Radiation passing through the slot 219 is reflected downwardly by the inclined reflective face 223 onto the other row 332 of fibre ends, mounted in the aperture 231. Any change in tire pressure causes the rod 216, and hence the mask 218, to move vertically: an increase in pressure causes the mask to be moved down; a decrease in pressure causes the mask to move up. As the mask 218 is moved, the length of the row 331 of fibres that is visible through the slot 219 will change such that an increase in tire pressure causes a greater length to become visible.

Change in tire pressure therefore causes a change in the amount of radiation passed by the mask 218 to the fibre bundle 233. This radiation is transmitted to the rear end of the cable 23, along the outer sleeve of fibres 236, and to the forward end of the cable 301 in the receiver unit 30. From there the radiation is supplied to the detector 32. It will be appreciated that the coaxial configuration of the bundles of fibres 235 and 236, and 300 and 302 enables signals to be passed between the rotating hub 2 and the stationary shaft 3 without interruption.

The system of the present invention enables an indication to be provided of the value of pressure within the tire rather than merely a warning signal when pressure is too high or too low. Since the system of the present invention does not employ inductive coils to pass signals between a rotating wheel and a fixed mounting, it can be of considerably less weight than some previous systems—this can be a particular advantage in aircraft having many wheels each of which would require a pressure sensing system. By avoiding the use of electromagnetic fields, there is no electrical interference by and to the system. The system can be made of sufficiently rugged construction to withstand the vibration and forces experienced by aircraft wheels during take off and landing.

It will be appreciated that various modifications could be made to the system described above. For example, the pressure sensor could be of an alternative construction employing optical sensing techniques, such as, for example using overlapping gratings to produce Moire fringes so that displacement of a pressure sensing element can be measured from displacement of the Moire fringes. The receiver unit mounted on the shaft need not provide an electrical output but could supply an output in the form of optical signals along an optical cable to a remote location.

Figure 5:
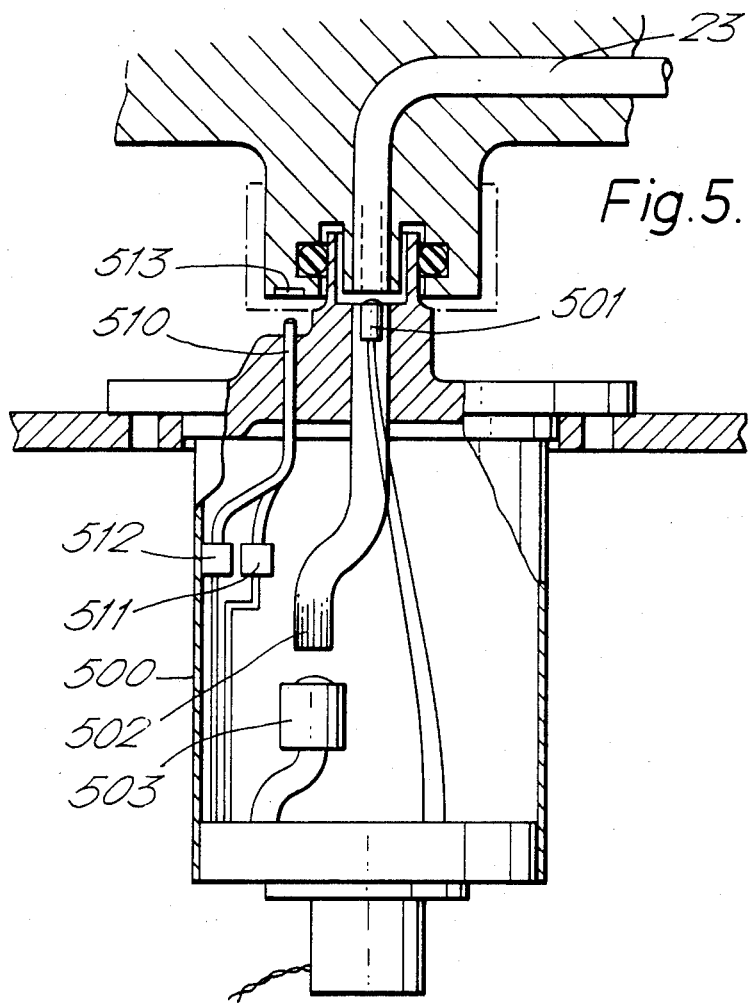
FIG. 5 is a schematic sectional side elevation of an alternative transmitter/receiver unit.

An alternative transmitter/receiver unit 500 is shown in FIG. 5. This is similar to the unit 30 shown in FIG. 3 except in that the semiconductor laser emitter 501 is mounted directly in front of the rear end 25 of the inner core 235 of the cable 23, without the interposition of a length of fibre-optic cable. A fibre-optic cable 502 in the transmitter/receiver unit 500 optically couples the detector 503 with the outer sleeve 236 of fibres in the cable 23. The forward end of the cable 502 is arranged as a ring around the emitter 501. Also included in the transmitter/receiver unit 500 is a wheel code pick-off 510. The pick-off 510 comprises an emitter 511 and detector 512 that are used to read a bar coding 513 printed on the cover plate 24 outwardly of the rear end of the cable 23. As the wheel rotates a pulsed output is produced by reflection from the coding 513 that is used to identify the wheel, each wheel having a different bar coding, and that can be used to measure wheel speed.

Figure 6:
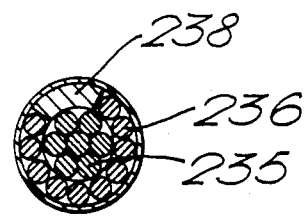
FIG. 6 is an end view of an alternative form of cable used to interconnect the sensor and receiver unit.

In the arrangements described above, the pressure is determined from the amplitude of radiation supplied to the detector, that is, it is of analogue form. In some circumstances it may be desirable instead to provide a digital output, this can also be readily realised, in accordance with the present invention. In such a digital system, the individual fibres in the outer, radiation-receiving bundle are arranged coherently so that the fibres in the row 332, at the forward end of the cable 25 are arranged in order at the rear end of the cable, around the outer ring 236. Such an arrangement is shown in FIG. 6. Preferably the rotating outer ring 236 has a blank segment 238, without any fibre bundle. This enables a speed output to be provided at high pressure, when all the fibres are illuminated. When the wheel is rotating, it will be appreciated that only one fibre need be provided in the outer ring 302 of the transmitter/receiver cable 301. By counting the pulsed output of this fibre, the number of fibres in the row 331 that are revealed by the slot 219 (and hence the pressure) can be determined. If is desired to measure tire pressure when the wheel is stationary, it is necessary to have the same number of fibres in the outer ring 302 of the transmitter/receiver cable 301, as in the outer ring 236 of the cable 25 on the wheel. Also, each fibre in the cable 301 would have to be connected to a respective detector so that by monitoring the outputs of the different detectors, it is possible to determine which fibres in the row 331 are revealed by the slot 219, and hence the pressure can be determined.

It will be appreciated that various other modifications are possible within the scope of the present invention.

What I claim is:

1. A tire pressure sensing system comprising: a pressure sensor mounted for rotation with a tire; an optical radiation guide mounted for rotation with the tire, said sensor supplying optical output signals to said radiation guide, said radiation guide directing the optical output signals to a location substantially coaxial of said tire; optical receiver means; and means mounting said receiver means on a stationary member coaxial of said tire and aligned to receive said optical output signals from the radiation guide, said receiver means supplying signals indicative of tire pressure to a location remote from said receiver means.

2. A tire pressure sensing system according to claim 1, wherein said radiation guide is a fibre-optic cable.

3. A tire pressure sensing system according to claim 2, wherein said fibre-optic cable includes a inner bundle of fibres and an outer bundle of fibres surrounding the inner bundle, and wherein said receiver supplies radiation to said sensor along one bundle, and wherein said sensor supplies radiation to the receiver along the other bundle.

4. A tire pressure sensing system according to claim 1, including a radiation detector, wherein said receiver includes a fibre-optic cable, wherein one end of said cable is aligned with the radiation guide, and wherein said fibre-optic cable supplies the optical output signals from the radiation guide to a radiation detector.

5. A tire pressure sensing system according to claim 1, wherein said sensor varies the amplitude of the optical output signals supplied to said radiation guide in accordance with change in pressure.

6. A tire pressure sensing system according to claim 1, including a mask, means for displacing said mask in accordance with change in pressure, an array of radiation-emitting elements located on one side of said mask, wherein said radiation guide is located on the opposite side of said mask, and wherein displacement of said mask controls radiation supplied to said radiation guide from the array of radiation-emitting elements.

7. A tire pressure sensing system according to claim 6, wherein said radiation guide includes a fibre-optic cable, wherein said cable includes a plurality of fibres associated respectively with individual ones of the array of radiation-emitting elements, and wherein said receiver monitors the output of each of said fibres so as to determine which of the radiation-emitting elements is exposed by said mask and hence provide an indication of pressure.

8. A tire pressure sensing system according to claim 6, wherein said means for displacing said mask includes a bellows unit, one side of which is in communication with tire pressure, and the other side of which is coupled with the mask so that deflection of the bellows on change in pressure causes displacement of the mask.

9. A tire pressure sensing system according to claim 1, wherein said receiver includes speed sensor means for providing an indication of the rotational speed of the tire.

10. A tire pressure sensing system comprising: a pressure sensor mounted for rotation with a tire, said sensor including a mask that is displaced in accordance with change in pressure; a fibre-optic cable mounted for rotation with the tire, said cable including an inner bundle of fibres and an outer bundle of fibres surrounding said inner bundle of fibres, one end of one of said bundles being arranged in a row on one side of said mask, and one end of the other of said bundles being arranged in a row on the other side of said mask, the other end of said cable extending to a location substantially coaxial of said tire; optical receiver means including radiation emitting means and radiation detecting means; and means mounting said receiver means on a stationary member coaxial of said tire in alignment with said cable, said radiation emitting means supplying radiation to one of said bundles of fibres, and said radiation detecting means receiving radiation from the other of said bundle of fibres that is modified in accordance with pressure by displacement of said mask.

* * * * *